US007028652B2

(12) United States Patent
Iwashita et al.

(10) Patent No.: US 7,028,652 B2
(45) Date of Patent: Apr. 18, 2006

(54) DEVICE FOR CONTROLLING AN INTERNAL COMBUSTION ENGINE WITH A VARIABLE VALVE TIMING SYSTEM

(75) Inventors: Yoshihiro Iwashita, Mishima (JP); Shigeo Kikori, Toyota (JP); Kazuhiko Shiratani, Susono (JP); Shouji Katsumata, Gotemba (JP); Keiji Yoeda, Numazu (JP); Makoto Ogiso, Mishima (JP); Hideyuki Nishida, Shizuoaka-ken (JP); Tomomi Yamada, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/695,822

(22) Filed: Oct. 30, 2003

(65) Prior Publication Data

US 2004/0089250 A1 May 13, 2004

(30) Foreign Application Priority Data

Nov. 5, 2002 (JP) ............................ 2002-321089

(51) Int. Cl.
*F01L 1/34* (2006.01)

(52) U.S. Cl. .............................. 123/90.15; 123/90.17; 123/348

(58) Field of Classification Search ............ 123/90.15, 123/90.16, 90.17, 90.18, 90.11, 90.12, 90.13, 123/21, 90.27, 90.31, 347, 348
See application file for complete search history.

(56) References Cited

U.S. PATENT DOCUMENTS

| | | | | |
|---|---|---|---|---|
| 3,953,969 | A * | 5/1976 | Mori et al. | 60/293 |
| 4,628,880 | A * | 12/1986 | Aoyama et al. | 123/432 |
| 5,398,502 | A * | 3/1995 | Watanabe | 60/284 |
| 5,421,308 | A * | 6/1995 | Hitomi et al. | 123/559.1 |
| 5,515,818 | A * | 5/1996 | Born | 123/90.11 |
| 5,611,303 | A * | 3/1997 | Izuo | 123/90.11 |
| 6,164,931 | A * | 12/2000 | Norton et al. | 417/407 |
| 6,237,551 | B1 * | 5/2001 | Macor et al. | 123/90.15 |
| 6,279,550 | B1 * | 8/2001 | Bryant | 123/559.1 |
| 6,347,619 | B1 * | 2/2002 | Whiting et al. | 123/568.12 |
| 6,530,361 | B1 * | 3/2003 | Shiraishi et al. | 123/435 |
| 6,637,386 | B1 * | 10/2003 | Murata et al. | 123/90.15 |
| 6,761,147 | B1 * | 7/2004 | Majima | 123/399 |
| 2001/0017115 | A1 | 8/2001 | Yoeda et al. | |

FOREIGN PATENT DOCUMENTS

| | | |
|---|---|---|
| DE | 10026990 A 1 | 6/2001 |
| DE | 10023420 A 1 | 11/2001 |
| JP | A 3-92546 | 4/1991 |
| JP | A 4-143423 | 5/1992 |
| JP | A 10-37773 | 2/1998 |
| JP | A 10-227226 | 8/1998 |
| JP | A 2000-170556 | 6/2000 |
| JP | A 2000-310120 | 11/2000 |
| JP | A-2000-328911 | 11/2000 |

* cited by examiner

*Primary Examiner*—Thomas Denion
*Assistant Examiner*—Ching Chang
(74) *Attorney, Agent, or Firm*—Oliff & Berridge, PLC

(57) ABSTRACT

A device for controlling an internal combustion engine with a variable valve timing system is provided. While the piston descends just after the combustion in the cylinder, the intake valve is opened by the variable valve system for the intake valve such that the intake air is supplied into the cylinder from the engine intake system.

10 Claims, 2 Drawing Sheets

DEVICE FOR CONTROLLING AN INTERNAL COMBUSTION ENGINE WITH A VARIABLE VALVE TIMING SYSTEM

BACKGROUND OF THE INVENTION

1. Field of the Invention

The present invention relates to a device for controlling an internal combustion engine with a variable valve timing system.

2. Description of the Related Art

In order to purify the exhaust gas immediately after the start of the engine, a catalytic converter arranged in the exhaust system of the engine must be activated quickly. For this purpose, in a control device disclosed in Japanese Unexamined Patent Publication No. 2000-170556, the exhaust valve is temporarily opened in the expansion stroke by using a variable valve timing system, and thus the exhaust gas at a high temperature, in the expansion stroke, is allowed to flow into the catalytic converter in an attempt to raise the temperature of the catalytic converter to an activating temperature quickly.

By the way, in general, combustion is unstable just after the start of the engine. To stabilize the combustion, therefore, the combustion air-fuel ratio is selected to be richer than the stoichiometric air-fuel ratio and, hence, the exhaust gas contains unburned fuel in a relatively large amount. According to the above control device, therefore, the catalytic converter can be activated quickly as compared to when it is normally heated. It is, however, advantageous to activate the catalytic converter quickly by burning the unburned fuel in the exhaust gas exhausted in the exhaust stroke in the catalytic converter by using the secondary air rather than by raising the temperature of the catalytic converter by utilizing the exhaust gas temperature only, though the temperature of the exhaust gas exhausted in the exhaust stroke may be lower than that exhausted in the expansion stroke.

However, a pipe for communicating the air cleaner with the engine exhaust system, and a pump for supplying the secondary air to the engine exhaust system, cannot be easily mounted on a vehicle.

SUMMARY OF THE INVENTION

It is therefore an object of the present invention to provide a device, for controlling an internal combustion engine with a variable valve timing system, which can easily supply the secondary air to the exhaust gas of a rich air-fuel ratio in order to activate the catalytic converter quickly without using a pipe and the like that cannot be easily mounted on the vehicle.

A device, for controlling an internal combustion engine with a variable valve timing system, according to the present invention is characterized in that, while the piston descends just after the combustion in the cylinder, the intake valve is opened by the variable valve system for the intake valve such that the intake air is supplied into the cylinder from the engine intake system.

According to the device, the intake valve is opened while the piston descends just after the combustion, i.e., in the expansion stroke in 4-stroke engines or in the scavenging stroke in 2-stroke engines, such that the intake air is supplied into the cylinder. Therefore, when the exhaust valve is opened, the intake air in the cylinder is supplied to the catalytic converter together with the exhaust gas of a rich air-fuel ratio just after the start of the engine. Thus, the secondary air can be easily supplied to the exhaust gas of the rich air-fuel ratio, without requiring pipes that cannot be easily mounted on the vehicle, the unburned fuel in the exhaust gas can be burned in the catalytic converter, and the catalytic converter as a whole can be heated up to the activating temperature quickly.

BRIEF DESCRIPTION OF THE DRAWINGS

FIG. 2 is time charts illustrating the control operations for opening and closing the intake valve and the exhaust valve, wherein

DESCRIPTION OF THE PREFERRED EMBODIMENT

Figure 1:
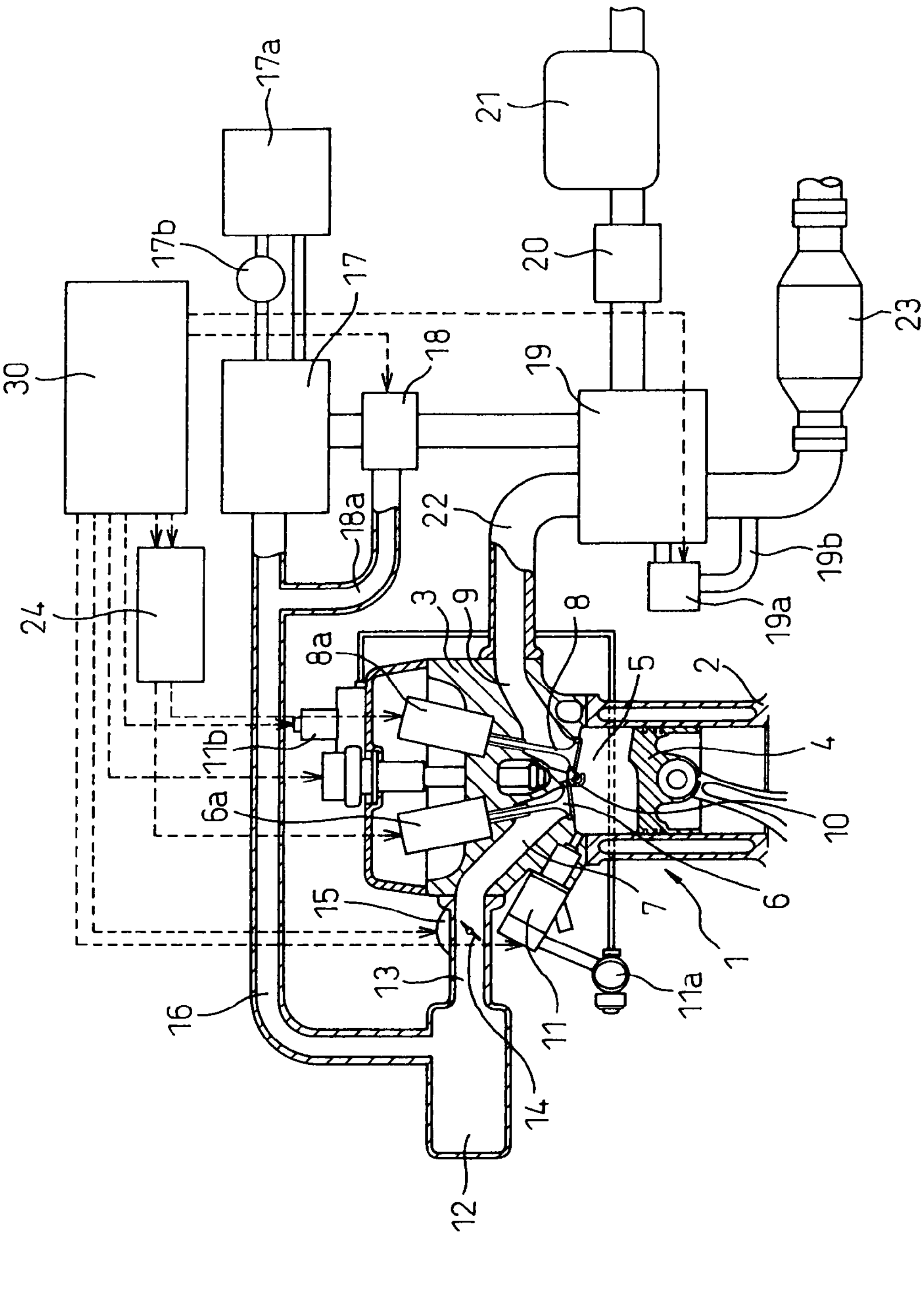
FIG. 1 is a view illustrating the whole constitution of an internal combustion engine on which a control device according to the invention is mounted.

FIG. 1 is a view illustrating the whole constitution of an internal combustion engine on which a control device according to the invention is mounted. Reference numeral 1 denotes an engine body, 2 denotes a cylinder block, 3 denotes a cylinder head, 4 denotes a piston and 5 denotes a combustion chamber. In the cylinder head 3, there are formed an intake port 7 communicated with the combustion chamber 5 via an intake valve 6, and an exhaust port 9 communicated with the combustion chamber 5 via an exhaust valve 5. Reference numeral 10 denotes a spark plug facing the combustion chamber 5, and 11 denotes a fuel injector for injecting fuel directly into the combustion chamber 5. Reference numeral 11*a* denotes a pressurized fuel chamber, for supplying the high-pressure fuel to the fuel injector 11 on each cylinder, that is maintained at a desired high fuel pressure by using the fuel fed from a fuel pump 11*b*.

A branch pipe 13 of an intake manifold located downstream of a surge tank 12 is connected to the intake port 7, and an intake air control valve 14 is disposed in the branch pipe 13 of each cylinder. The intake air control valve 14 is freely controlled in its opening degree by a drive unit 15 such as a step motor or the like. In an intake duct 16 located upstream of the surge tank 12, there are arranged, from the downstream side, an inter-cooler 17, a bypass flow rate adjusting valve 18, a compressor of a turbo charger 19 and an air flow meter 20. The intake duct 16 is communicated with the atmosphere through an air cleaner 21. Instead of the intake air control valve 14 in each branch pipe 13, there may be arranged a throttle valve in the intake duct 16 just upstream of the surge tank 12. In this case, it is desired that the throttle valve is driven by a step motor or the like similar to the intake control valve 14 and that its opening degree is freely set without being mechanically linked to the accelerator pedal.

The inter-cooler 17 is for cooling the intake air. and is, for example, water-cooled and has a radiator 17*a* and a circulation primp 17*b*. The bypass flow rate adjusting valve 18 has a bypass passage 18*a* bypassing the inter-cooler 17, and works to adjust the flow rate of the intake air that flows into the inter-cooler 17.

On the other hand, to the exhaust port 9 of each cylinder is connected a branch pipe 22 of an exhaust manifold located upstream of the turbine of the turbo charger 19. The downstream side of the turbine of the turbo charger 19 is communicated with the atmosphere through a catalytic converter 23 in which a three-way catalytic converter and a $NO_x$ absorbing and reducing catalytic converter axe arranged in series. Reference numeral 19*a* denotes a boost pressure adjusting valve arranged in a waste gate passage 19*b* bypassing the turbine of the turbo charger 19.

The intake valve 6 can be opened and closed at any time by an electromagnetic actuator 6*a* as a variable valve timing system for the intake valve. The exhaust valve 8 also can be opened and closed at any time by an electromagnetic actuator 8*a* as a variable valve timing system for the exhaust valve. Reference numeral 24 denotes a drive circuit for driving the electromagnetic actuators 6*a* and 8*a*, and is controlled by a control device 30. The control device 30 not only opens and closes the intake valves 6 and the exhaust valves 8 via the drive circuit 24, but also control the opening degree of the intake air control valve 14 via the drive unit 15, the amount of injected fuel and the fuel injection timing via the fuel injector 11, the ignition timing via the spark plug 10, the fuel pressure in the pressurized fuel chamber 11*a* via the fuel pump 11*b*, the temperature of the intake air via the bypass flow rate adjusting valve 18, and the boost pressure via the boost pressure adjusting valve 19*a*.

Figure 2A:
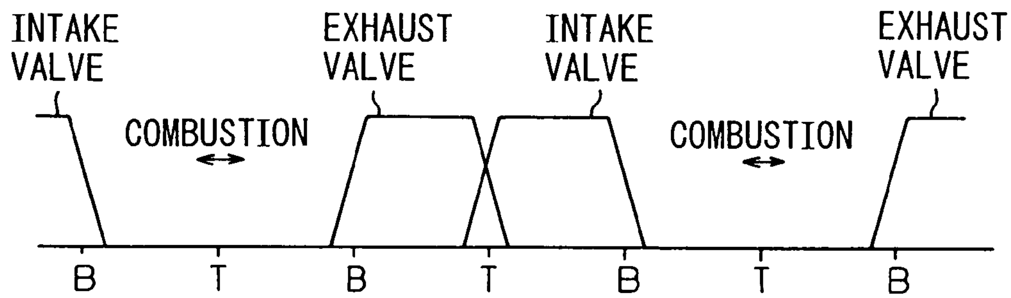
FIG. 2(A) illustrates the control operation in normal engine operating conditions.

FIG. 2 is a time chart of control of the opening and closing of the intake valve 6 and the exhaust valve 8 by the control device 30 via the electromagnetic actuators 6*a* and 8*a*. In FIG. 2, (B) represents the bottom dead center and (T) represents the top dead center. FIG. 2(A) illustrates controlling the opening and closure of the intake valve 6 and the exhaust valve 8 in a normal engine operation. In the normal engine operation, the engine carries out the 4-stroke operation including intake stroke, compression stroke, expansion stroke and exhaust stroke, wherein the intake valve 6 is opened just before the exhaust top dead center and is closed just after the intake bottom dead center, and the exhaust valve 8 is opened just before the expansion bottom dead center and is closed just after the exhaust top dead center.

In the 4-stroke operation and when, for example, the required amount of injected fuel is small, the fuel is injected in the latter half of the compression stroke to form a combustible mixture near the spark plug and thus a stratified charge combustion enabling the combustion at a lean air-fuel ratio in the cylinder as a whole is carried out. When the amount of injected fuel becomes large, accompanying an increase in the engine load, the fuel is injected in the intake stroke to form a uniform mixture in the cylinder as a whole and thus the uniform charge combustion is carried out at mainly the stoichiometric air-fuel ratio. In either the stratified charge combustion or the uniform charge combustion, the ignition is effected by the spark plug 10 near the compression top dead center, and combustion occurs until just after the compression top dead center.

In combustion at a lean air-fuel ratio, as in the stratified charge combustion, the exhaust gas contains $NO_x$ in amounts larger than HC and CO, and the $NO_x$ absorbing and reducing catalytic converter is used for purifying the $NO_x$. In the combustion at the stoichiometric air-fuel ratio, as uniform charge combustion, HC, CO, and $NO_x$ in the exhaust gas are favorably purified by using the three-way catalytic converter.

Thus, in the normal engine operation, no matter which combustion is carried out, the exhaust gas is favorably purified by the $NO_x$ absorbing and reducing catalytic converter or the three-way catalytic converter, By the way, during the start of the engine and just after the start of the engine, for example, uniform charge combustion is carried out. At this time, however the catalyst in the three-way catalytic converter has not been heated up to its activating temperature, and thus is not capable of favorably purifying the exhaust gas. The three-way catalytic converter will eventually be warmed up, and the catalyst that is carried thereon will all be completely activated to favorably purify the exhaust gas. Until then, however, the exhaust gas that is not sufficiently purified is emitted into the atmosphere. In order to decrease the amount of this emission, it has been desired to warm up the three-way catalytic converter as quickly as possible, so that the temperature of the catalytic converter as a whole is elevated up to the catalytic activating temperature.

During the start of the engine and just after the start of the engine, the injected fuel is not favorably vaporized and thus the combustion becomes unstable. Therefore, the combustion air-fuel ratio is set to be richer than the stoichiometric air-fuel ratio, and thus unburned fuel is contained in relatively large amounts in the exhaust gas. Therefore, if the unburned fuel is burned by the catalyst at a moment when only the catalyst carried on the exhaust upstream portion of the three-way catalytic converter is elevated up to the activating temperature, the whole catalytic converter can be elevated up to the catalytic activating temperature at a very early time. usually, however, this cannot be realized due to the shortage of oxygen.

Figure 2B:
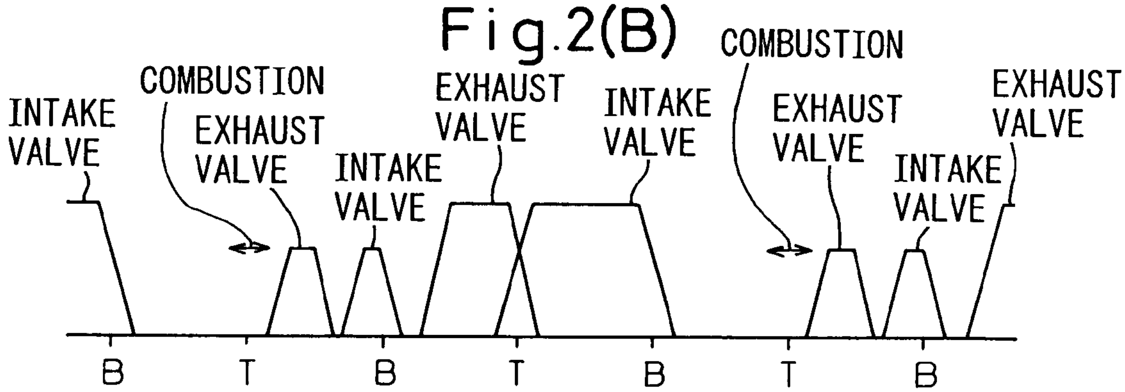
FIG. 2(B) illustrates the control operation just after the start of the engine.

FIG. 2(B) illustrates controlling the opening and closure of the intake valve 6 and the exhaust valve 8 just after the start of the engine. Here, the exhaust valve 8 is opened at the initial stage of the expansion stroke after the end of combustion just after the compression top dead center to lower the pressure in the cylinder down to, preferably, nearly the atmospheric pressure, and then the exhaust valve 8 is closed. Therefore, from the middle stage in the expansion stroke up to just after the expansion bottom dead center, the pressure in the cylinder becomes smaller than the atmospheric pressure due to an increase in the volume of the cylinder as the piston descends. During this period, the intake valve 6 is opened to introduce the intake air into the cylinder.

In the exhaust stroke, the exhaust valve 8 is opened again, whereby the intake air introduced into the cylinder is fed, as the secondary air, together with the exhaust gas containing unburned fuel in large amounts into the three-way catalytic converter. Therefore, if only the catalyst carried on the exhaust upstream portion of the three-way catalytic converter is heated to the activating temperature, then, the unburned fuel can be burned by this catalyst by using a sufficient amount of oxygen contained in the intake air and thus the three-way catalytic converter as a whole can be heated to the activating temperature of the catalyst very quickly. The combustion heat of the unburned fuel in the upstream portion of the three-way catalytic converter works not only to elevate the temperature of the three-way catalytic converter as a whole but also to elevate the temperature of the $NO_x$ absorbing and purifying catalytic converter. located on downstream side thereof up to the activating temperature quickly.

Even during the start of the engine and before combustion takes place in all the cylinders, the exhaust valve 8 and the intake valve 6 may be opened in the expansion stroke similar to immediately after the start of the engine in which the combustion takes place in all the cylinders. During the start of the engine, however the combustion in each cylinder takes the utmost precedence and therefore it is preferable, for reliable ignition and combustion, that such opening and closing control of the intake valve 6 and the exhaust valve 8 is not carried out.

Just after the start of the engine, a large amount of the intake air is not required and, thus, the amount of the intake air supplied into the cylinder in the intake stroke is throttled by the intake air control valve 14 or the throttle valve. Therefore, the pressure in the cylinder can become lower than the atmospheric pressure in the middle stage in the expansion stroke or in the last stage of the expansion stroke even when the exhaust valve 8 is not opened in the initial stage of the expansion stroke just after the combustion and thereby the pressure in the cylinder is not lowered. In this case, if the intake valve 6 is opened when the pressure in the cylinder becomes lower than the atmospheric pressure, the intake air can be supplied into the cylinder. Accordingly, in this case, the exhaust valve 8 is not required to open in the initial stage of the expansion stroke.

Despite the intake air being introduced into the cylinder in the expansion stroke and supplied to the three-way catalytic converter, the unburned fuel in the exhaust gas cannot be burned when the catalyst of the three-way catalytic converter has not all been activated. Here, if the exhaust valve 8 is opened in the initial stage of the expansion stroke just after the combustion, the pressure in the cylinder drops and, at the same time, the exhaust gas of a high temperature just after the combustion is fed to the three-way catalytic converter. This is advantageous for elevating the temperature of the catalyst on the exhaust upstream portion of the three-way catalytic converter up to the activating temperature quickly.

The present embodiment has dealt with the case where the three-way catalytic converter in the catalytic converter 23 is located upstream of the $NO_x$ absorbing and reducing catalytic converter. If the $NO_x$ absorbing and reducing catalytic converter is located on the upstream side, the unburned fuel in the exhaust gas is burned in the same manner as described above by the oxidation catalyst carried on the $NO_x$ absorbing and reducing catalytic converter, and thus the three-way catalytic converter as a whole can be heated together with the $NO_x$ absorbing and reducing catalytic converter as a whole up to their activating temperatures quickly. In the present embodiment, further, each of the combustion during the start of the engine and the combustion immediately after the start of the engine is the uniform charge combustion at a rich air-fuel ratio by injecting the fuel in the intake stroke. These combustions, however, may be the stratified charge combustion at a rich air-fuel ratio by injecting the fuel in the latter half of the compression stroke.

Figure 2C:
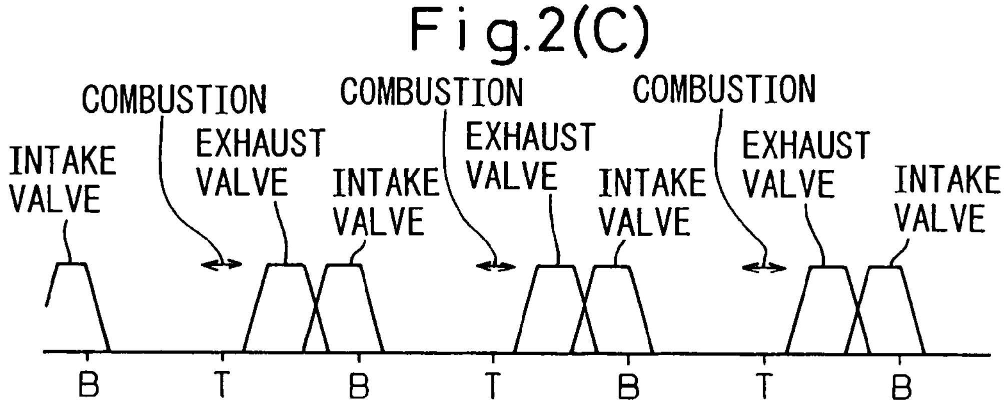
FIG. 2(C) illustrates the control operation in low engine load operating conditions.

Upon favorably purifying the exhaust gas by using the catalytic converter 23 as described above, the control for opening and closing the intake valve 6 and the exhaust valve 8 in the expansion stroke shown in FIG. 2(B) is stopped and, instead, the ordinary control for opening and closing as shown in FIG. 2(A) is carried out. In low-engine load operating conditions, according to the present embodiment, however, the 4-stroke operation may be changed over to the 2-stroke operation by controlling the opening and closing of the intake valve 6 and the exhaust valve 8 as shown in FIG. 2(C).

In the 2-stroke operation, a valve overlap period is provided for the intake valve 6 and the exhaust valve 8. However, the opening and closing thereof are nearly the same as the opening and closing in the expansion stroke in FIG. 2(B). Namely, the exhaust valve is opened to discharge the exhaust gas in the initial stage of the scavenging stroke just after the combustion, whereby the pressure in the cylinder drops. when the intake valve is opened in the intermediate stage of the scavenging stroke, therefore, the intake air is introduced into the cylinder. Then, the compression stroke is assumed, and the combustion starts near the compression top dead center. In the 2-stroke operation, the timing for injecting the fuel is after the exhaust valve 8 is closed in the scavenging stroke.

In the present 2-stroke operation, the ignition may be effected by the spark plug 10 near the compression top dead center. However, if the mixture is self-ignited, the combustion period is shortened and the amount of produced $NO_x$ can be decreased. Therefore, the present 2-stroke operation is based on self-ignition.

When a mixture is burned, in general, there are formed free radicals of HC and the like. If free radicals are left in the cylinder, the mixture is easily self-ignited the next time due to the activity thereof. Free radicals are very active. In the 4-stroke operation, the period from just after the combustion that forms free radicals to the ignition timing in the last stage of the compression stroke of the next time is long. In the ignition timing, the fre radicals have alr ady been chemically reacted with other substances, and the activity of the free radicals cannot be utilized for self-igniting the mixture.

In the 2-stroke operation, on the other hand, the period from just after the combustion to the last stage of the compression stroke is short, and free radicals formed by the combustion can be present in the mixture until the last stage of the compression stroke, and thus the mixture can be self-ignited. That is, despite the exhaust valve 8 being opened in the scavenging stroke, the exhaust gas is not all discharged out of the cylinder; i.e., free radicals of HC are contained in the exhaust gas remaining in the cylinder, and can be utilized for self-ignition. When the exhaust gas remains in relatively large amounts in the cylinder, the inert gas that is the chief component of the exhaust gas lowers the temperature of combustion to decrease the amount of produced $NO_x$. In the 2-stroke operation in which the period is short until the ignition timing, the temperature of the exhaust gas can be utilized for self-ignition.

During a low load operation of the engine carrying out the 2-stroke operation, the amount of the exhaust gas is small, the turbo charger 19 does not work well, and thus the intake air pressure can hardly be boosted. As described concerning the opening and closing control operation (FIG. 2(B)) just after the start of the engine, however, if the pressure in the cylinder is lowered by opening the exhaust valve in the initial stage of the scavenging stroke just after the combustion, the pressure in the cylinder in the low engine load operation becomes reliably lower than the atmospheric pressure due to an increase in the volume in the cylinder as the piston descends, and the intake is reliably supplied into the cylinder even without the boosting.

In the present embodiment, electromagnetic actuators were used as the variable valve timing systems for intake valve and as the variable valve timing system for exhaust valve, which, however may be replaced by hydraulic actuators. Further, such actuators may not be used. Namely, when the intake valve 6 and the exhaust valve 8 are controlled by three patterns only shown in FIGS. 2(A), 2(B) and 2(C), then, the cam shaft for the intake valve and the cam shaft for the exhaust valve may be provided with three cams, respectively, for realizing these three patterns, these cams are changed over, and only the required cams may become effective.

In the present embodiment, the intake valve is opened in the expansion stroke of 4-stroke engines or in the scavenging stroke in 2-stroke engines such that the intake air is supplied into the cylinder by using of the difference between the intake port pressure and the cylinder pressure. Accordingly, strictly speaking, the intake valve is controlled to open when the actual intake port pressure in the expansion stroke or the scavenging stroke becomes higher than the cylinder pressure. However, the intake valve control in accordance with the actual intake port pressure is very complicated. Accordingly, in the present embodiment, the intake port pressure in the expansion stroke or the scavenging stroke is always assumed to be atmospheric pressure to simplify the intake valve control.

The invention claimed is:

1. A device for controlling an internal combustion engine with a variable valve system wherein, while a piston of the engine descends during an expansion stroke in a cylinder of the engine, an intake valve is opened by the variable valve system for the intake valve such that intake air is supplied into the cylinder from the engine intake system, and pressure in the cylinder is lowered by opening an exhaust valve at an initial stage just after compression top dead center of the expansion stroke by the variable valve system for the exhaust valve and is then closed while in the expansion stroke before said intake valve is opened.

2. The device for controlling an internal combustion engine according to claim 1 wherein, said intake valve is opened when secondary air is required in an exhaust system of the engine.

3. The device for controlling an internal combustion engine according to claim 2 wherein, when the pressure in the cylinder becomes lower than atmospheric pressure, said intake valve is opened by said variable valve system for the intake valve such that the intake air is supplied into the cylinder from an air intake system of the engine.

4. The device for controlling an internal combustion engine according to claim 2 wherein, said variable valve system is an electromagnetic actuator.

5. The device for controlling an internal combustion engine according to claim 1 wherein, when the pressure in the cylinder becomes lower than atmospheric pressure, said intake valve is opened by said variable valve system for the intake valve such that the intake air is supplied into the cylinder from an air intake system of the engine.

6. The device for controlling an internal combustion engine according to claim 5 wherein, said variable valve system is an electromagnetic actuator.

7. The device for controlling an internal combustion engine according to claim 1 wherein, said exhaust valve opened by said variable valve system causes exhaust of the exhaust gas from the cylinder, and said intake valve opened by said variable valve system causes supply of the intake air into the cylinder, such that operation of the engine can be changed from a 4-stroke operation to a 2-stroke operation.

8. The device for controlling an internal combustion engine according to claim 7 wherein, said variable valve system is an electromagnetic actuator.

9. The device for controlling an internal combustion engine according to claim 7, wherein while in the 2-stroke operation a valve overlap period is provided and the exhaust valve is closed after the intake valve is opened.

10. The device for controlling an internal combustion engine according to claim 1 wherein, said variable valve system is an electromagnetic actuator.

* * * * *